US012743381B1

(12) United States Patent
Webman et al.

(10) Patent No.: US 12,743,381 B1
(45) Date of Patent: Sep. 22, 2026

(54) METHOD AND SYSTEM FOR MANAGING CACHE EVICTION BASED ON RECENCY AND FREQUENCY

(71) Applicant: Regatta Data Ltd., Bet Hanania (IL)

(72) Inventors: Erez Webman, Petach Tikva (IL); Sivan Tal, Lisbon (PT); Alon Shimon Gweta, Dishon (IL)

(73) Assignee: Regatta Data Ltd., Bet Hanania (IL)

( * ) Notice: Subject to any disclaimer, the term of this patent is extended or adjusted under 35 U.S.C. 154(b) by 0 days.

(21) Appl. No.: 19/178,113

(22) Filed: Apr. 14, 2025

(51) Int. Cl.
*G06F 12/12* (2016.01)
*G06F 12/122* (2016.01)

(52) U.S. Cl.
CPC .................................. *G06F 12/122* (2013.01)

(58) Field of Classification Search
CPC ..................................................... G06F 12/122
See application file for complete search history.

(56) References Cited

U.S. PATENT DOCUMENTS

| | | | | |
|---|---|---|---|---|
| 6,738,865 | B1 | 5/2004 | Burton et al. | |
| 9,892,045 | B1 * | 2/2018 | Douglis | G06F 12/122 |
| 9,921,963 | B1 * | 3/2018 | Li | G06F 12/127 |
| 10,019,364 | B2 * | 7/2018 | Shetty | G06F 3/0688 |
| 10,534,758 | B1 * | 1/2020 | Carpenter | G06F 3/0649 |
| 2020/0210385 | A1 * | 7/2020 | Carpenter | G06F 3/0649 |
| 2022/0004495 | A1 * | 1/2022 | Natarajan | G06F 3/0625 |
| 2022/0283956 | A1 * | 9/2022 | Carpenter | G06F 12/122 |
| 2024/0086331 | A1 * | 3/2024 | Hsu | G06F 12/0866 |

* cited by examiner

*Primary Examiner* — Kevin Verbrugge
(74) *Attorney, Agent, or Firm* — M&B IP Analysts, LLC

(57) ABSTRACT

A system and method for managing cache eviction are provided. The method includes establishing a plurality of time cycles for a cache, each time cycle including at least one tick, wherein an occurrence of a tick is variably determined; assigning a heat score to each cached data item of a plurality of cached data items; maintaining each cached data item in a partition of a plurality of contiguous partitions based on a heat score range of each partition that the heat score of each cached data item is within; when a cached data item is accessed, updating a first heat score of the cached data item to a second heat score; and when inserting at least one data item into the cache exceeds storage space of the cache, evicting at least one cached data item from an eviction-ready partition.

20 Claims, 5 Drawing Sheets

Partition 310-0

Evicted

Cached item A

Cached item B

Cached item C

Cached item D

Partition 310-1

Cached item E

Partition 310-2

New entry

Cached item N

Cached item F

Cached item G

Cached item H

Partition 310-3

Cached item K

Cached item L

Partition 310-4

Cached item M

Partition 310-0

Cached item A

Cached item B

Cached item C

Cached item D

Moved

Partition 310-1

Cached item B

Cached item E

Partition 310-2

Cached item F

Cached item G

Cached item H

Partition 310-3

Cached item K

Cached item L

Partition 310-4

Cached item M

METHOD AND SYSTEM FOR MANAGING CACHE EVICTION BASED ON RECENCY AND FREQUENCY

TECHNICAL FIELD

The present disclosure relates generally to methods for performing cache eviction.

BACKGROUND

Memory hierarchies are a structured approach to organizing different levels of memory in a computer system, with the goal of improving the speed and efficiency of data access. At the top of the hierarchy, there is fast but small storage such as registers and cache memory, followed by larger, slower storage such as Random-Access Memory (RAM) that stores data and instructions that are currently running on a Central Processing Unit (CPU), and finally, even larger and slower storage like hard disks (HDDs) or solid-state drives (SSDs). Cache memory serves as a buffer between the CPU and RAM, storing frequently accessed data to minimize the time it takes to fetch information from slower storage. Disk caching refers to caching data items from disk storage into a main memory such as RAM. Memory caching refers to caching data items from a main memory such as RAM into a CPU's on-board cache.

The performance of cache memory is influenced by the frequency of cache hits (when requested data is found in the cache) and cache misses (when the requested data is not in the cache but in some other storage medium). Items that are accessed more often are referred to as "hot" cached items, while those that are accessed less frequently are considered "cold." Cache management solutions tend to keep hot cached items in the cache longer than cold items, but the longevity of the hot cached items depends on how well the cache management solution handles eviction policies and how many data items are competing for space.

Steady-state systems that rely on cache face several challenges. Cache management solutions face high computational costs. The cost (in terms of both processing and memory overhead) of maintaining a cache may be higher than the cost of directly accessing data from slower storage. One solution mentioned in U.S. Pat. No. 6,738,865 includes the use of a list that ranks cached items based on the recency and frequency with which cached items are retrieved. This solution, however, does not address the high computational cost of determining which cached items, among the low ranking (cold) cached items, to evict.

Further, traditional cache management solutions employ a time counter to track and determine how hot or cold cached items are at certain times, but these solutions require the performance of costly calculations for a large number of cached items at every tick of the time counter.

U.S. Pat. No. 6,738,865 and other prior art solutions also fail to address the need for scan resistance. Scan resistance refers to the ability of the cache to maintain useful items in memory even when many new data items are accessed in rapid succession. Steady state systems using traditional cache management solutions experience low scan resistance. When an application accesses many different data items from the disk, this impacts hot cache items including newly cached items, creating a significant impact on cache efficiency.

Additionally, storing metadata in RAM for cache management consumes significant RAM, often at the expense of cache capacity itself, further impacting the performance of cache management solutions. Traditional cache management solutions evict certain cached items too slowly, making it difficult to ensure that space is available for new data items to be cached.

It would, therefore, be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that is in operation causes or cause the system to perform the actions. One or more computer programs can be configured to perform particular operations or actions by virtue of including instructions that, when executed by data processing apparatus, cause the apparatus to perform the actions.

In one general aspect, a method may include establishing a plurality of time cycles for a cache, each time cycle including at least one tick, where the occurrence of a tick is variably determined. The method may also include assigning a heat score to each cached data item of a plurality of cached data items. The method may furthermore include maintaining each cached data item in a partition of a plurality of contiguous partitions based on a heat score range of each partition that the heat score of each cached data item is within. The method may in addition include when a cached data item is accessed, updating a first heat score of the cached data item to a second heat score. The method may moreover include when inserting at least one data item into the cache exceeds storage space of the cache, evicting at least one cached data item from an eviction-ready partition. Other embodiments of this aspect include corresponding computer systems, apparatus, and computer programs recorded on one or more computer storage devices, each configured to perform the actions of the methods.

Implementations may include one or more of the following features. The method where the heat score reflects the frequency and recency with which a cached data item is accessed. The method where the heat score ranges of the plurality of contiguous partitions and the heat scores of each cached data item implicitly decay, by a decay factor, with each tick of a time cycle. The method where the eviction-ready partition has a heat score range that includes cached data items with the lowest heat scores relative to the heat scores of other cached items. The method where the occurrence of the tick is variably determined based on the occurrence of at least one cache event. The method where the at least one cache event includes any one or more of: an insertion, an eviction, an access, a modification, an expiration, and a cache miss. The method where each heat score range of the plurality of contiguous partitions is defined by a lower boundary and an upper boundary, where the lower boundary is the lowest heat score of a cached data item allowed in the partition, and where the upper boundary is the highest heat score of a cached item allowed in the partition, thereby partitioning the cached items based on dynamically-computed heat scores indicating the heat level of the cached items. The method may include: setting the upper boundary and the lower boundary of each partition; and setting the decay factor of the time cycles. The method, when a time cycle ends, may include: merging the cached data items of a $P_1$ partition into a $P_0$ partition, where the $P_1$ partition has a heat score range that includes cached data items with the next lowest heat scores relative to the heat scores of cached items in the $P_0$ partition; re-labelling a partition labeled as $P_j$ to be labeled as $P_{j-1}$, where $2 \leq j \leq (k+1)$; and creating a new partition with a highest heat score range, where the new partition is empty. The method may include: when a data item is inserted into the cache: assigning the first heat score of the cached data item; and determining a current partition into which the cached data item belongs, where the heat score of the cached data item is within the heat score range of the current partition. The method may include: when the cached data item is accessed, computing the second heat score of the cached data item; when the second heat score of the cached data item is outside of the heat score range of a current partition: determining a new partition into which the cached data item belongs; removing the cached data item from the current partition; and inserting the cached data item into the new partition. The method where metadata of each cached data item includes the first heat score of the cached data item and a first tick in which the first heat score was computed. The method where updating the first heat score of a cached data item to the second heat score further may include: receiving the metadata of the cached data item; computing the second heat score based on the decay factor associated with the difference between a second tick and the first tick, the first heat score, and a cache access increment value associated with the access of the cached data item; and storing updated metadata that includes the second heat score and the second tick. The method may include: inserting at least one new data item into the cache; and assigning an initial heat score to the at least one new data item, where the initial heat score is higher than the heat scores of some other cached data items that were in the cache before the at least one new data item was inserted. The method may include: providing an eviction-resistance measure for cached data items with heat scores that are higher than the initial heat score of the at least one new data item, where an eviction-resistance measure protects the cached data items from being evicted from the cache. Implementations of the described techniques may include hardware, a method or process, or a computer tangible medium.

In one general aspect, non-transitory computer-readable medium may include one or more instructions that, when executed by one or more processing circuitries of a device, cause the device to: establish a plurality of time cycles for a cache, each time cycle including at least one tick, where the occurrence of a tick is variably determined; assign a heat score to each cached data item of a plurality of cached data items; maintain each cached data item in a partition of a plurality of contiguous partitions based on a heat score range of each partition that the heat score of each cached data item is within; when a cached data item is accessed, update a first heat score of the cached data item to a second heat score; when inserting at least one data item into the cache exceeds storage space of the cache, evict at least one cached data item from an eviction-ready partition. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: establish a plurality of time cycles for a cache, each time cycle including at least one tick, where the occurrence of a tick is variably determined; assign a heat score to each cached data item of a plurality of cached data items; maintain each cached data item in a partition of a plurality of contiguous partitions based on a heat score range of each partition that the heat score of each cached data item is within; when a cached data item is accessed, update a first heat score of the cached data item to a second heat score; and when inserting at least one data item into the cache exceeds storage space of the cache, evict at least one cached data item from an eviction-ready partition. Other embodiments of this aspect include corresponding computer systems, apparatus, and computer programs recorded on one or more computer storage devices, each configured to perform the actions of the methods.

Implementations may include one or more of the following features. The system where the heat score reflects the frequency and recency with which a cached data item is accessed. The system where the heat score ranges of the plurality of contiguous partitions and the heat scores of each cached data item implicitly decay, by a decay factor, with each tick of a time cycle. The system where the eviction-ready partition has a heat score range that includes cached data items with the lowest heat scores relative to the heat scores of other cached items. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
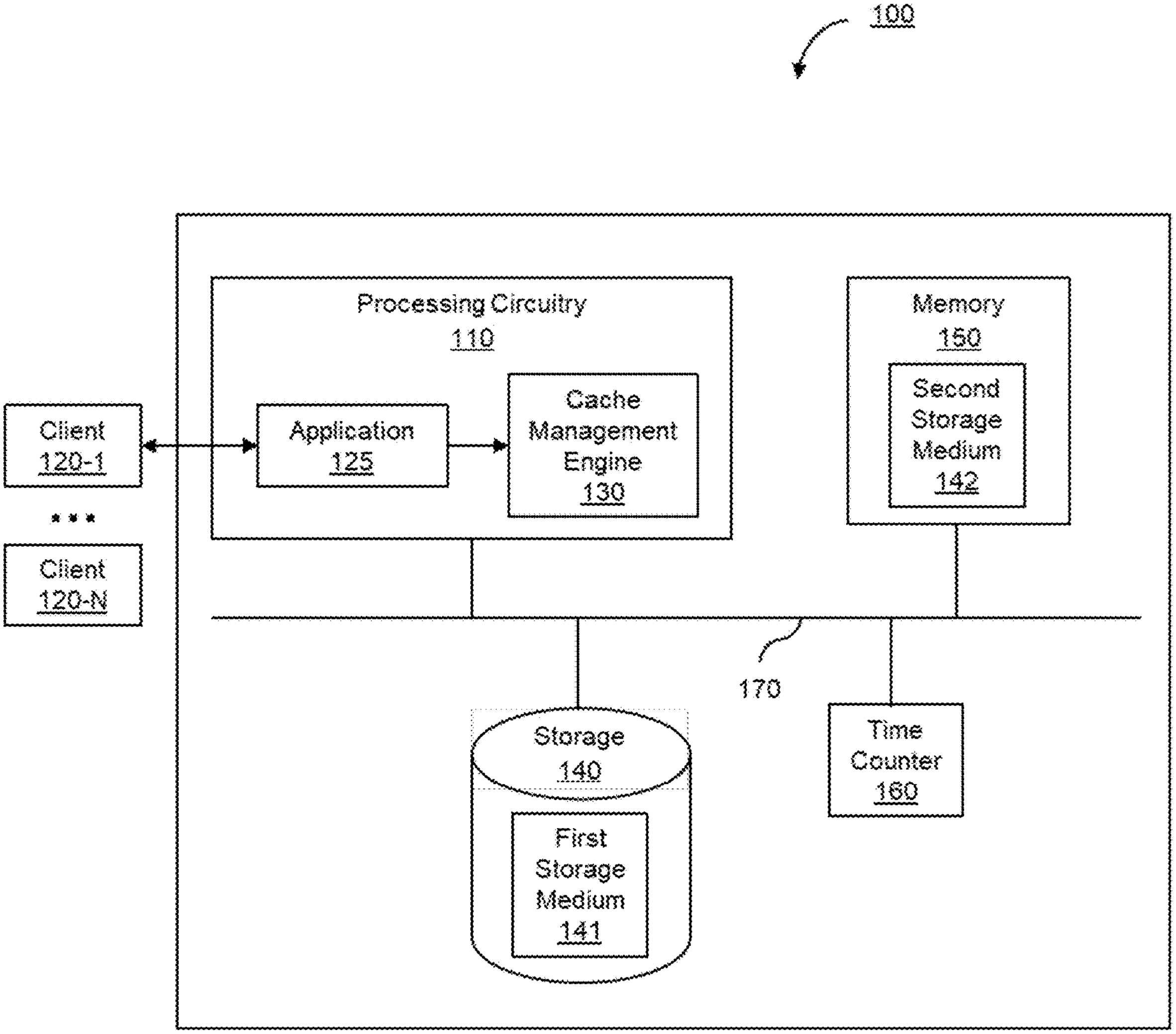
FIG. 1 is an example schematic diagram of a computing environment 100 that illustrates a high-level overview of the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for improved cache eviction decisions. The disclosed embodiments provide for partitioning cached items based on dynamically-computed scores that indicate the heat level of the cached items (hereinafter "partitions" or "heat partitions"). The disclosed embodiments provide data structures that preclude the use of computationally-intensive calculations of heat scores at regular time increments otherwise required by traditional cache management solutions. A cache hit (hereinafter, "access") on a cached item increases the heat score of the cached item, but the heat score otherwise implicitly decays exponentially over some time measure and does not need to be regularly re-calculated. Cached items may be moved into different heat partitions based on the effect of accesses of the cached items to the heat scores of those cached items. The disclosed embodiments allow for cache eviction decisions based on the heat partitions. The source of evictions is the heat partition containing the cached items with the lowest heat scores. The use of heat partitions allows for quicker and cheaper eviction decisions. The cached items in the same heat partition have similar scores, and cached items in the same heat partition can be evicted without having to perform a search based on their order within the heat partition, and with no further calculation related to heat scores.

Furthermore, the disclosed embodiments allow for increased scan resistance while still providing a pool of eviction-ready cached items in the cache. A cached item recently inserted in the cache is given an initial score. The initial score of this recently-inserted cached item may be higher than the scores of some other data items in the cache. This provides the recently-inserted cached item with some eviction resistance. In the case of a large number of insertions of cached items into the cache, the disclosed embodiments provide eviction resistance to newly-inserted cached items while still providing eviction resistance to cached items with heat scores that are higher than the initial score.

Additionally, the disclosed embodiments store metadata of the heat score (two numbers for each cached item), allowing for more efficient storage of accurate information about the history of each cached data item. The current heat score of a cached item can be dynamically computed based on the score metadata and the current time, though this is necessary only when a cached data item is accessed. Compared to traditional methods, the disclosed embodiments allow for the heat scores to be updated less frequently as heat scores of cached items are updated only upon an access of that cached item. In the absence of an access of the cached item, the heat score of the cached item decays implicitly through time cycles with a built-in decay factor. The disclosed embodiments include maintaining a time cycle based on, but not limited to, various cache events, which allows the cache to be self-timed and allows for accommodating periods of varying intensity of operations (e.g., high, low, or idle).

FIG. 1 is an example schematic diagram of a computing environment 100 that illustrates a high-level overview of the various disclosed embodiments. The computing environment 100 includes processing circuitry 110 coupled to storage 140, memory 150 and time counter 160. Processing circuitry 110 includes application 125 and cache management engine 130. Clients 120 are configured to perform operations on the processing circuitry 110 via application 125. Operations may include, but are not limited to, read operations and write operations. Depending on the location (first storage medium 141 or second storage medium 142) of data pertinent to a request by client 120, application 125 retrieves the data from either the first storage medium 141 on storage 140 or second storage medium 142 on memory 150.

In some embodiments, application 125 is a software program or system that facilitates the retrieval, manipulation, and presentation of data from one or more sources. Application 125 interacts with data storage systems, services, or other repositories, typically using specific protocols, APIs, or query languages, to fetch, update, or analyze data based on user or system requests. Data may be specific data items or entire data-rows in a database. As used herein, "data" shall be understood to encompass any unit of information, irrespective of format, structure, or size. This includes, without limitation, blocks, segments, sectors, tracks, chunks, blobs, database rows, and the like, whether fixed in size or variable. The term "data" further includes metadata associated with such units, as well as any whole, partial, or subdivided portions thereof.

In some embodiments, time counter 160 refers to a hardware or software mechanism in computing environment 100 that tracks the passage of time, records time elapsed from a specific reference point, and/or generates periodic signals used to synchronize operations and time-dependent tasks.

Storage 140 includes first storage medium 141, and memory 150 includes second storage medium 142. First storage medium 141 stores data items. The second storage medium 142 stores the data items from the first storage medium 141 as cached items. Storing data items as cached items in the second storage medium 142 allows for easier and faster retrieval of a cached item by client 120. Caching data items from the first storage medium 141 in the second storage medium 142 serves to accelerate the reading of the data items. In an embodiment, caching data items from the first storage medium 141 to a second storage medium 142 is performed by cache management engine 130.

In an embodiment, the first storage medium 141 is larger, cheaper, and/or slower than the second storage medium 142. The first storage medium 141 may be a persistent disk storage such as, but not limited to, a Solid-State Drive (SSD) or a Hard Disk Drive (HDD). The second storage medium 142 may be a non-persistent storage medium such as RAM.

Cache management engine 130 monitors the operations and requests from clients 120 for data and monitors the data on the first storage medium 141 and second storage medium 142. Cache management engine 130 establishes time cycles and partitions on the second storage medium 142 and is configured to execute the embodiments disclosed with respect to FIG. 3. Based on the recency and frequency with which certain data items are retrieved from second storage medium 142, cache management engine 130 performs operations on the cached items in second storage medium 142, including but not limited to moving cached items from one partition (not shown) to another as explained in more detail herein.

In some embodiments, computing environment 100 may be realized on a node, in a non-distributed database, or more than one node, in a distributed database. According to these embodiments, each node may be realized as a physical device or a virtual instance executed on a physical device. A virtual device may include a virtual machine, a software container, a service, and the like. The physical device includes at least a processing circuitry and a memory. A physical device may also include a storage, a shared storage accessed by other nodes, or a combination thereof. The nodes may be deployed in one or more data centers (on-prem or in the cloud), cloud computing platforms, and the like.

Cache management engine 130 may be realized in hardware, software, firmware, or a combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

In an embodiment, cache management engine 130 manages second storage medium 142 (e.g., cache) of memory 150. The cache management engine 130 is configured to execute operations on the second storage medium 142 of memory 150, including maintaining time cycles linked to at least one cache operation and establishing partitions in the cache. Establishing partitions in the cache serves to group cached items based on how recently and frequently the client 120 retrieves particular cached items, at each time cycle, from the second storage medium 142 of memory 150. Operations of cache management engine 130 are discussed in more detail herein.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 150 may be volatile (e.g., random access memory, etc.), non-volatile (e.g., flash memory, etc.), or a combination thereof. In some embodiments, memory 150 is updatable.

In one configuration, software for implementing one or more embodiments disclosed herein may be stored in the memory 150. In another configuration, the storage 140 is configured to store such software. Software shall be construed as defined hereinabove. The instructions, when executed by the processing circuitry 110, cause the processing circuitry 110 to perform the various processes described herein.

The storage 140 may be magnetic storage, optical storage, and the like, and may be realized, for example, as flash memory or other memory technology, compact disk-read only memory (CD-ROM), Digital Versatile Disks (DVDs), or any other medium which can be used to store the desired information. Storage 140 is usually a slower storage medium than memory 150.

It should be understood that the embodiments described herein are not limited to the specific architecture illustrated in FIG. 1, and other architectures may be equally used without departing from the scope of the disclosed embodiments. Various modifications, adaptations, and alternative configurations may be implemented without departing from the spirit and scope of the disclosed embodiments.

It should be understood that the modules and components described in reference to FIG. 1 may be implemented in software, firmware, hardware, or any combination thereof. In embodiments where the engines are implemented in software, they may comprise instructions stored on a non-transitory computer-readable medium and executed by one or more processors to perform the described functions. The scope of the disclosed embodiments is not limited to any particular implementation, and various modifications, adaptations, and equivalent arrangements may be made without departing from the disclosed embodiments.

Figure 2:
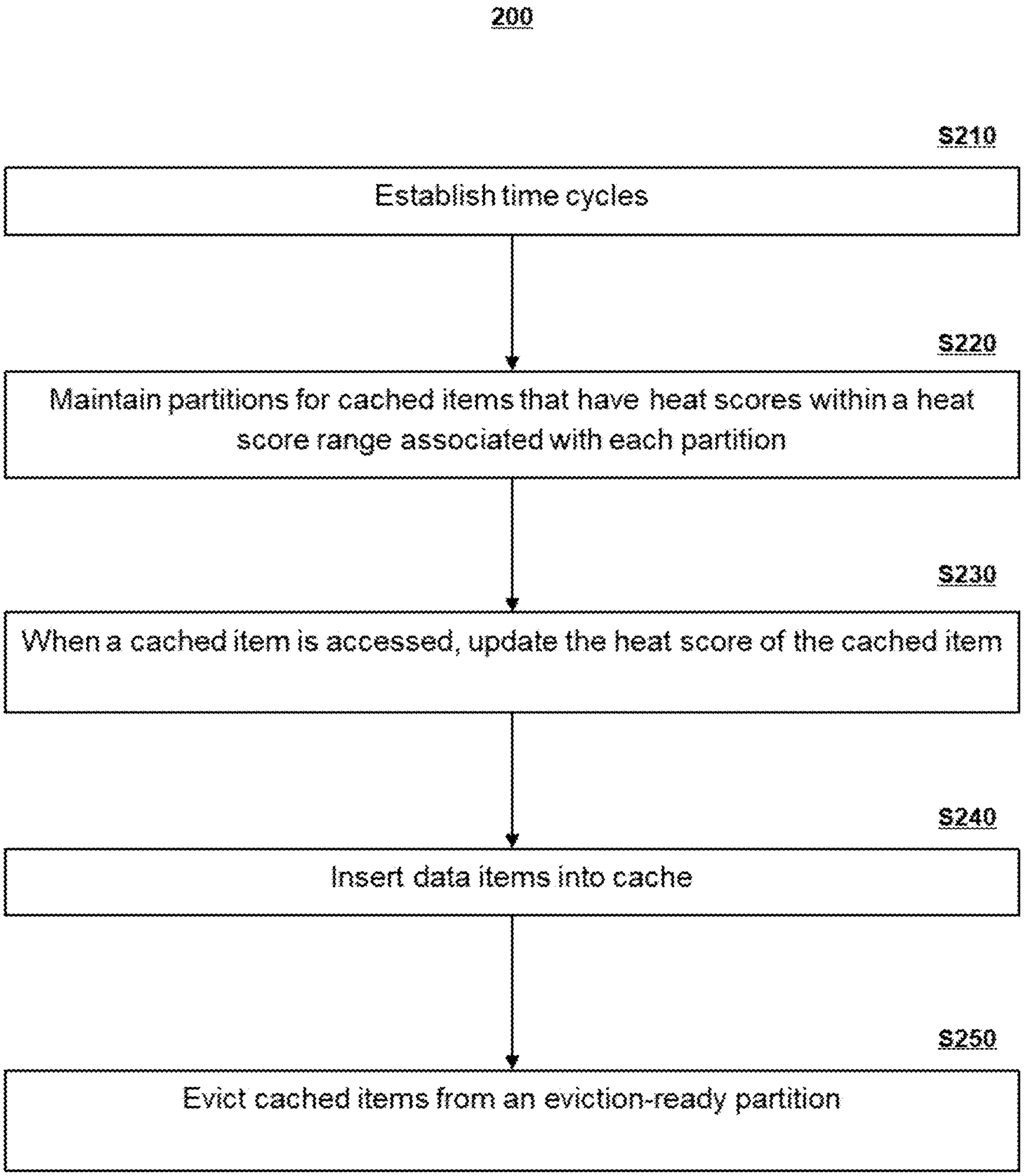
FIG. 2 is an example flowchart 200 of a process for managing cache eviction according to an embodiment.

FIG. 2 is an example flowchart 200 of a process for managing cache eviction according to an embodiment. In an embodiment, the process is performed by cache management engine 130, FIG. 1.

At S210, time cycles are established. A time cycle includes ticks. The length of a time cycle is based on the number of ticks per cycle. For example, one hundred thousand (100,000) ticks may be a time cycle. In one embodiment, the length of a time cycle is fixed. In other embodiments, the length of a time cycle may change for various reasons.

In an embodiment, the timing of each tick of a time cycle is variably determined based on the occurrence of at least one cache event. A cache event includes an operation on the cache, such as, but not limited to, an insertion, an eviction, an access, a modification, an expiration, and a cache miss. The term tick is used hereinafter for these events, although each tick may or may not be connected to the time of a clock. Using at least one cache event as the tick allows for the cache to be self-timed, linking operations on the cache to the events of the cache. This linking of the time cycles to cache events by using at least one cache event as the ticks in a time cycle allows the cache to accommodate periods with high-intensity operations, low-intensity operations, and idle periods.

In some embodiments, ticks may be clock ticks of the CPU (e.g., time counter 160 of computing environment 100, FIG. 1). In an embodiment, a tick may be a clock tick of a wall clock. In some embodiments, the tick may be linked to events such as, but not limited to, some other activity of the memory (e.g., memory 150, FIG. 1) that contains the cache.

In the above example, a time cycle with 100,000 ticks would have a ticks per cycle (TPC) of 100,000. The TPC denotes the length of the time cycle. According to various embodiments, the TPC may be determined based on a variety of factors, including, but not limited to, the nature of the workload, the size of the cache (e.g., current size, periodic size, maximum size, or desired size), the number of cached data items in the cache, the number of data items in the storage (e.g., disk), or a combination thereof.

At S220, partitions for cached items are maintained. Each partition has a heat score range. The heat score range of partitions are contiguous (adjacent and non-overlapping). The heat score range of a partition defines a lower and upper bound of heat scores. Each partition is a pool for all the cached items whose heat scores fall within the heat score range of the partition. Maintaining partitions includes merging operations, re-labeling operations, and creation operations on partitions executed at every cycle detailed hereinafter. In one embodiment, within each partition, no order is kept based on heat scores of the cached items. In various disclosed embodiments, the data structure of the partition may be, but is not limited to, a linked list, a doubly linked list, a set, a bag, or another appropriate data structure.

In an embodiment, there is a maximum heat score, $S_{max}$. As a non-limiting example, $S_{max}$ is a power of 2, for instance, $2^k$. Since heat scores decay over time, explained hereinbelow, $S_{max}$ defines the maximal time for a cached item, when not accessed, to reside in cache. K is an integer that defines the partition with the highest heat score range and is derived from the cycle decay constant (defined hereinbelow) and $S_{max}$. The current scores of all cached items, in the example, fall in the heat score range $(0, 2^k]$. To establish partitions, the heat score range is extended to $(0, 2^{k+1}]$. The heat score range $(0, 2^{k+1}]$ is divided into (k+2) sub-ranges:

$(0, 2^0], (2^0, 2^1], (2^1, 2^2], \ldots, (2^{k-1}, 2^k], (2, 2^{k+1}]$.

The data structures established for each of these sub-ranges is a partition. In an embodiment, partitions are labeled based on the upper boundaries (e.g., partition with a sub-range of $(2^{i-1}, 2^i]$ is labeled as $P_i$). In the above example, from left to right, the partition labels are $P_0$, $P_1$, $P_2$, $P_k$, and $P_{k+1}$. In an embodiment, the boundaries change at each tick of a time cycle as discussed in more detail hereinbelow. In the below representation, the sub-ranges are re-formatted without exponents for convenience:

$(0, 1], (1, 2], (2, 4], \ldots, (S_{max}/2, S_{max}], (S_{max}, 2*S_{max}]$.

In an embodiment, the heat score ranges of each partition decay with each tick in a time cycle. The heat score ranges of each partition decay implicitly with each tick just as the heat scores of cached items implicitly decay when the cached items are not accessed (explained in more detail with respect to S230). While the heat score ranges of each partition decay with each tick, the heat score ranges are not re-calculated at each tick. According to this embodiment, the lower and upper boundaries of the heat score ranges of each partition are multiplied by a cumulative decay factor $d^v$, where d represents a decay factor (d<1) and v is the number of ticks that have passed since the start of a cycle. According to the above example, the heat score ranges of the heat partitions, multiplied by $d^v$, serve to decay the heat score ranges as shown:

$(0*d^v, 1*d^v], (1*d^v, 2*d^v], (2*d^v, 4*d^v], \ldots, (S_{max}/2*d^v, S_{max}*d^v], (S_{max}*d^v, 2*S_{max}*d^v]$.

The cycle decay factor ($d^{TPC}$), as explained in more detail at S230, is the decay factor when the number of ticks is the entire cycle. The cycle decay constant is $1/d^{TPC}$. In an embodiment, $d^{TPC}$ is $$\frac{1}{2}.$$

Selecting a $d^{TPC}$ of $$\frac{1}{2}$$

and establishing each lower and upper boundary of the heat score ranges as a power of 2 for $P_0$, $P_1$, $P_2$, $P_k$, and $P_{k+1}$ serves to reset all the boundaries of the heat score ranges at the end of a cycle. When the $d^{TPC}$ is ½ in the above example, at the end of a cycle, the boundaries are:

$(0, ½], (½, 1], (1, 2], \ldots, (S_{max}/4, S_{max}/2], (S_{max}/2, S_{max}]$.

As in the previous example, in some embodiments, the contents of $P_1$ are added to $P_0$; partition $P_j$ is re-labeled as $P_{j-1}$; where $2 \le j \le (k+1)$; and $P_{k+1}$ is created as an empty partition. According to the embodiments, performing the operations listed above, when the $d^{TPC}$ is ½, cause resetting all the boundaries of the heat score ranges of each partition at the end of a cycle, thus maintaining the partitions. Performing such operations is achieved through simple data structure operations, requiring no calculations.

The heat score of each cached item, as explained in detail at S230, decays using the same decay factor as the boundaries of the partitions use. Both the heat score and the partition boundaries decay at the same rate. The theoretical current heat score of a cached item, which is not accessed, in a partition would remain within the boundaries of the partition containing the cached item even after both the heat score and the boundaries decay. The current heat score of a cached item is not calculated and the metadata of the cached item is not updated unless the cached item is accessed. It is sufficient that the lower and upper boundaries of the partition containing the cached item also bound the current heat score of the cached item.

At S230, the heat score of a cached item is updated when the cached item is accessed. The current heat scores of cached items are computed through simple calculations based on the stored metadata, which includes only a data tuple, as explained in more detail herein.

Each cached item in the cache is assigned a heat score. A heat score is a function of the distribution of accesses of a cached item over time. For example, the heat score is a function of the number of accesses on the cached item and when each access occurred. A heat score, $h_t$, is a heat score of a cached item at time t. Time t corresponds to one tick in a time cycle. After one tick, time is t+1. The heat score of each cached item decays at each tick. In the above example, $$h_{t+1} = h_t * d,$$

where d is the decay factor introduced above.

The heat score of a cached item at the start of cycle $C_1$ is $h_{c_i}$. When the cached item is not accessed during the entire $C_1$, the heat score of the cached item decays. At the start of the next cycle $C_2$ it can be calculated as:

$$h_{c_2} = h_{c_1} * d^{TPC}$$

where $d^{TPC}$ represents a cycle decay factor. In some embodiments, $d^{TPC}$ is 1/n, where n is an integer. In some embodiments, the $d^{TPC}$ is $$\frac{1}{2}.$$

For simplicity of description, $d^{TPC}$ is assumed to $$\frac{1}{2}.$$

According to this embodiment, the heat score of each cached item that is not accessed decreases by half every TPC ticks.

The heat score is updated only upon a cache access. The increase in value to the heat score upon a cache access is $S_{hit}$. As in the previous example, the heat score of a cached item at time t+1 that is accessed during t+1 is:

$$h_{t+1} = h_t * d + S_{hit}.$$

In some embodiments, the $S_{hit}$ is a constant. In other embodiments, $S_{hit}$ may be changed dynamically as the cache changes. For example, $S_{hit}$ is dynamically changed as the cache fills up. Assigning a higher increment to $S_{hit}$ gives the cached item more opportunities to be accessed before the cached item is evicted. In other embodiments, $S_{hit}$ is a multiplicative factor rather than an additive factor. Establishing $S_{hit}$ as a multiplicative factor increases the heat score proportionally to the current heat score of the cached item. In other embodiments, the change to the current heat score of a cached item when the cached item is accessed is a function combining both multiplicative and additive factors.

The effect of a cached item not being accessed at time u is represented by the following formula:

$$h_u = h_t * d^{(u-t)}.$$

The effect of a cached item being accessed at time u is represented by the following formula:

$$h_u = h_t * d^{(u-t)} + S_{hit}.$$

The effect of accesses over some time period on the heat score of a cached item may increase the heat score of the cached item faster than the heat score decays. As the heat score increases for the cached item, the decay of the heat score takes longer, allowing the cached item to remain in the cache for longer than if the cached item were not accessed as often. Additionally, the more time the cached item spends in the cache, the more opportunities the cached item has to be accessed. This embodiment accounts for the fact that cached items that are accessed have a greater likelihood of being requested again at a future time than cached items that are not accessed. This embodiment allows the accessed cached items to be in cache longer and increases the likelihood that the accessed cached items are kept in cached when requested again at a future time.

Score metadata of each cached item is stored as opposed to the heat score, which changes dynamically. For each cached item, a tuple ($h_t$, t) is stored, for example, in RAM, where $h_t$ is the computed heat score at time t. When a cached item is accessed, the current heat score of cached items may be calculated quickly and cheaply using the above formulas and based on the score metadata and the current time. At this time, the score metadata of the cached item is updated to the current heat score and the current time. There is no need to calculate the current heat score of a cached item at any other time.

In an embodiment, when a cached item is accessed, the access may cause the cached item to be moved from one partition to another. For example, when an access on a cached item causes the cached item's heat score to exceed the upper boundary of the partition that the cached item is currently in, the cached item will be moved to the partition that has a heat score range that the cached item's updated heat score (due to the access) falls within. The effect of an access of a cache item, according to a variety of embodiments, is explained in more detail below with respect to FIGS. 3A-3C.

At S240, insert data items into cache. In an embodiment, a data item that is newly inserted into the cache is given an initial heat score, $S_{init}$, that is usually higher than some other cached items in the cache before the newly inserted cached item is inserted. In some embodiments, the $S_{init}$ is (cycle decay constant)$^{k/3}$. In other embodiments, $S_{init}$ may be changed dynamically as the cache changes. For example, $S_{init}$ is dynamically changed so that the $S_{init}$ is higher than the heat scores of, for instance, twenty percent (20%) of cached items in the cache. Assigning a higher initial heat score to a newly inserted cached item, according to some embodiments, serves to provide the newly cached item with some minimal eviction resistance. The higher initial heat score gives the newly cached item time in the cache and opportunities to be accessed before the cached item is evicted.

At S250, cached items are evicted from an eviction-ready partition. The eviction-ready partition is a partition with the lowest heat score range that is not empty. In an embodiment, cached items are evicted only when inserting a new data item into the cache would exceed storage space of the cache and the new data item has a higher initial heat score than a cached item in the eviction-ready partition. In an embodiment, the latency of insertions of new cached items into the cache is reduced by asynchronously evicting cold cached items when the cache nears full. As explained above at S240, in some embodiments, a newly cached item is assigned an initial heat score that is sufficiently high not to be subject to eviction as compared to cached items in partitions with lower heat score ranges of heat scores.

The eviction-ready partition contains the cached items with the lowest heat scores relative to other cached items. The cached items in the eviction-ready partition have not been accessed as recently or as frequently as the cached items in other partitions. As in a previous example with respect to S220, $P_0$ contains the cached items with the lowest heat scores, and $P_{k+1}$ contains the cached items with the highest heat scores.

In some embodiments, any cached items, regardless of their relative heat scores, grouped within the eviction-ready partition serve as a source of eviction. Eviction of cached items from the eviction-ready partition can be achieved without any computations or calculations, such as calculating which cached item within the eviction-ready partition to evict based on relative heat scores.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3A:
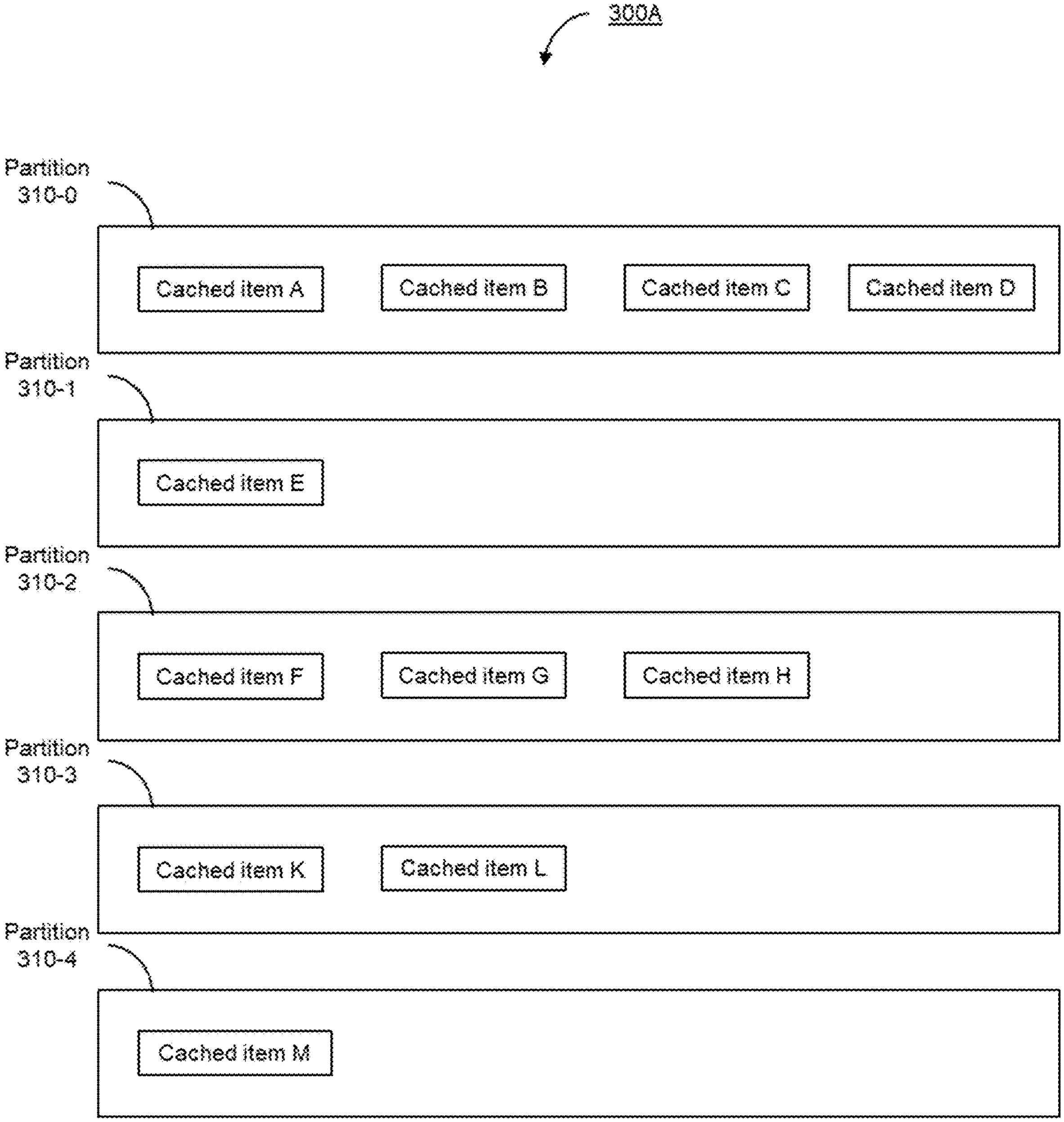
FIG. 3A shows an example cache 300A illustrating partitions according to an embodiment.

FIG. 3A shows an example cache 300A illustrating partitions according to an embodiment. In an embodiment, the cache 300A may be realized as second storage medium 142, FIG. 1.

Partitions 310-0 through 310-4 may be depicted as a variety of different data structures such as, but not limited to, a linked list, a doubly linked list, a set, a bag, or another appropriate data structure, according to various embodiments. In an embodiment, each cached item A through M in the example cache 300A has a respective score metadata denoted as ($h_{t_A}$, $t_A$) through ($h_{t_M}$, $t_M$). In an embodiment, the heat score ranges of Partition 310-0 through Partition 310-4 may be as follows:

Partition 310-0: $(0*d^v, 1*d_v]$
Partition 310-1: $(1*d^v, 2*d^v]$
Partition 310-2: $(2*d^v, 4*d^v]$
Partition 310-3: $(4*d^v, 8*d^v]$
Partition 310-4: $(8*d^v, 16*d_v]$ The cached items in each respective partition have current heat scores that fall within the current heat score range for the partition that the cached items are in.

Figure 3B:
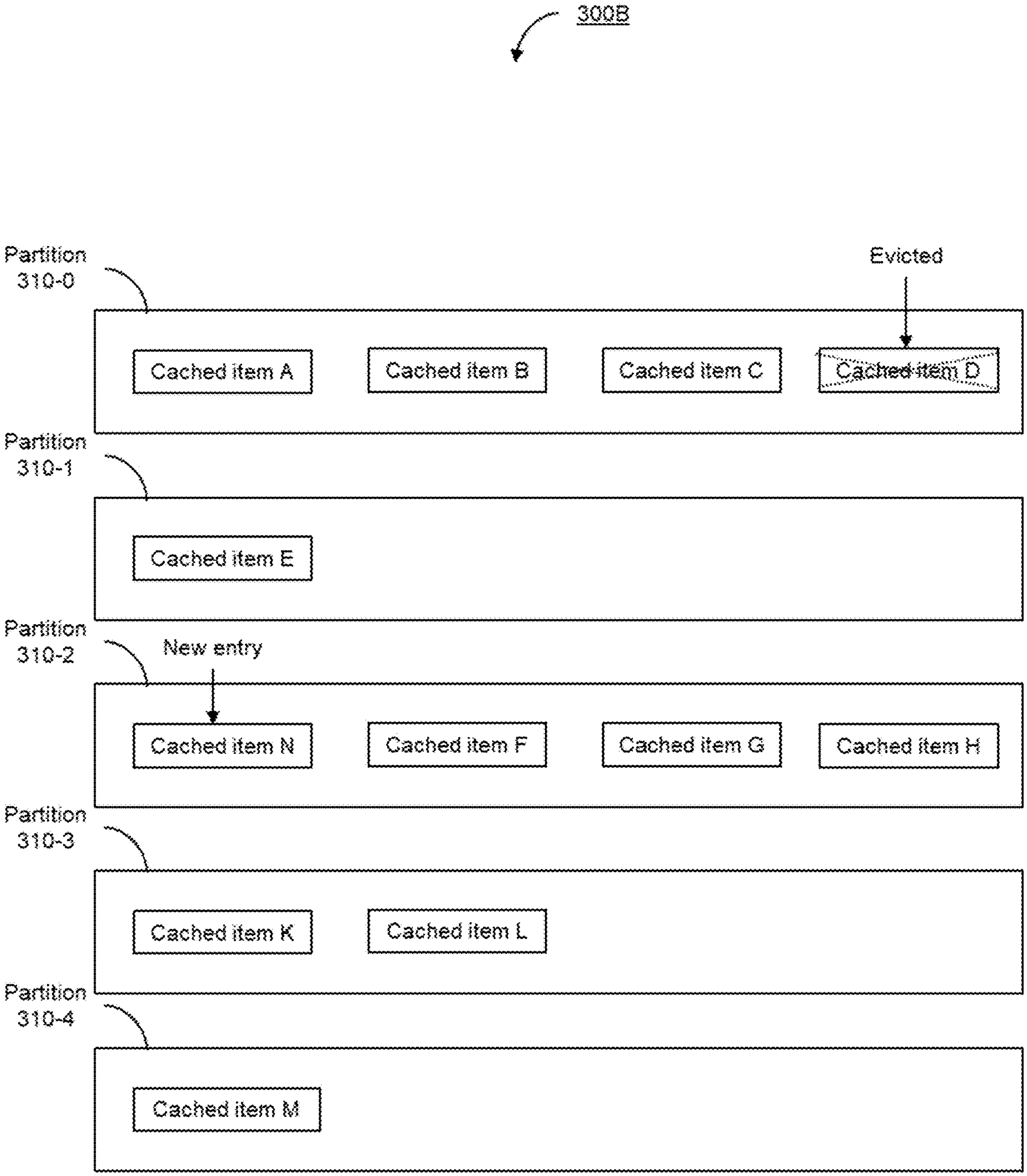
FIG. 3B shows an example cache 300B illustrating the insertion of a newly cached item and the eviction of another cached item according to an embodiment.

FIG. 3B shows an example cache 300B illustrating the insertion of a newly cached item and the eviction of another cached item according to an embodiment. In an embodiment, the cache 300B may be realized as second storage medium 142, FIG. 1. The various embodiments with respect to Partitions 310-0 through 310-4 and cached items A through M illustrated in example cache 300A, FIG. 3A apply in example cache 300B.

In an embodiment, cached item N is assigned an initial heat score, $S_{init}$, of three (3). According to this embodiment, $(2*d_v) < S_{init} \geq (4*d^v)$. Cached item N is inserted in the cache at time $t_N$, which is v ticks after the start of a cycle. Cached item N is inserted into Partition 310-2 because $S_{init}$ falls within the heat score range $(2*d^v, 4*d^v]$ of Partition 310-2. In an alternative embodiment, when, for example, $S_{init} \geq (4*d^v)$, cached item N is inserted into Partition 310-3. Cached item N will be assigned a score metadata of ($S_{init}$, $t_N$).

In some embodiments, the cache is full and there is not enough space in the cache to insert cached item N without evicting other cached items. In some embodiments, cached item D, which is a cached item in the eviction-ready partition (Partition 310-0), is evicted. In some embodiments, any other cached items A-C in Partition 310-0 may be evicted arbitrarily regardless of the order of the cached items in Partition 310-0, and regardless of the order of their current heat scores or their score metadata.

Figure 3C:
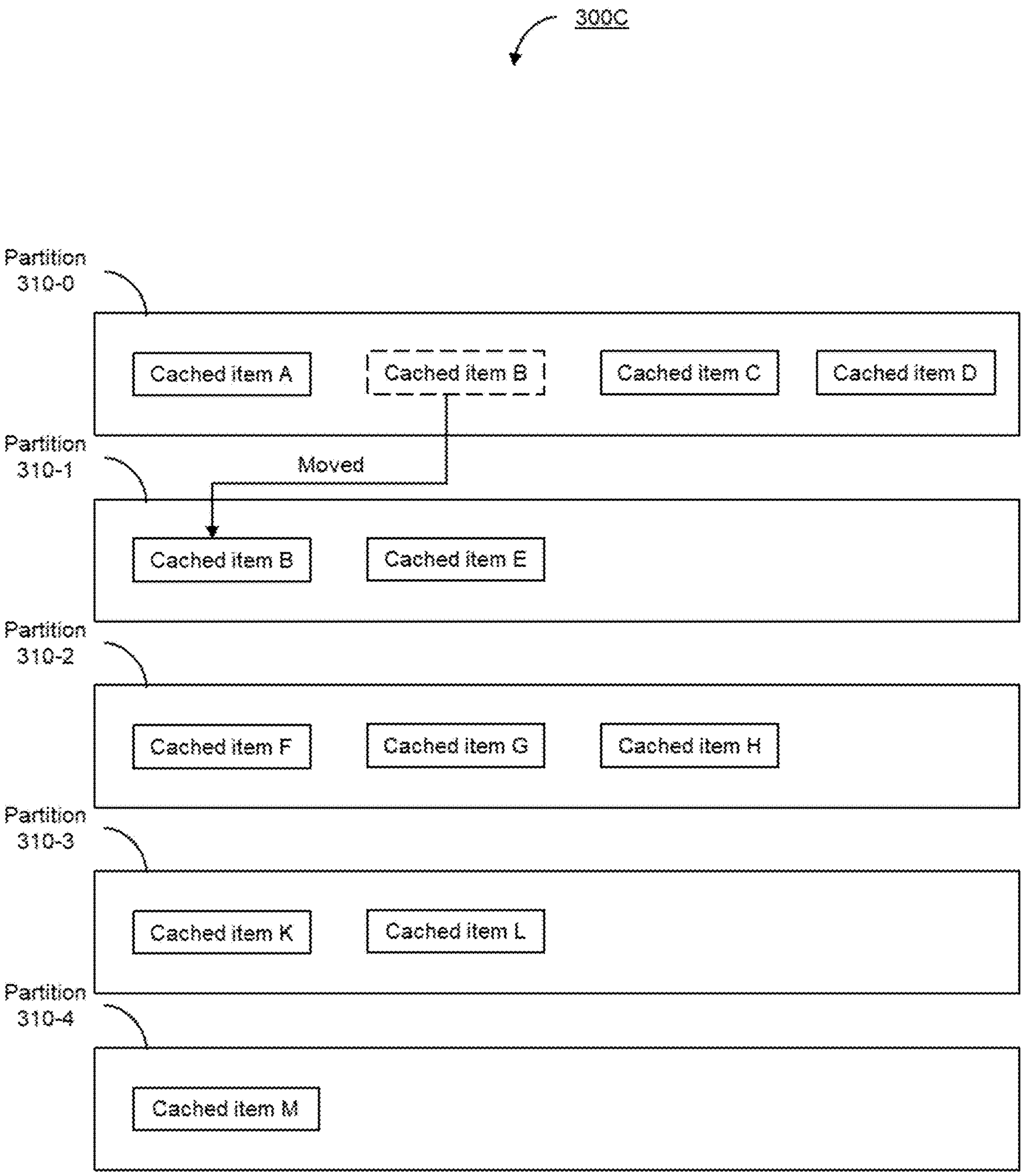
FIG. 3C shows an example cache 300C illustrating the movement of a cached item that has been accessed from one partition into another partition.

FIG. 3C shows an example cache 300C illustrating the movement of a cached item that has been accessed from one partition into another partition according to an embodiment. In an embodiment, the cache 300C may be realized as second storage medium 142, FIG. 1. The various embodiments with respect to Partitions 310-0 through 310-4 and cached items A through M illustrated in example cache 300A, FIG. 3A apply in example cache 300C.

In some embodiments, cached item B has a score metadata of ($h_{t_B}$, $t_B$). Cached item B is accessed at time $t_B'$, which is v ticks after the start of a cycle, and, in this embodiment, $S_{hit}=1$. In some embodiments, the cache access increment value $S_{hit}$ is the same as $S_{init}$. The heat score of cached item B at time $t_B'$ is calculated based on the current score metadata of cached item B and the following formula:

$$h_{t_B'} = h_{t_B} * d^{t_B' - t_B} + S_{hit}$$

In some embodiments, $(1*d^v) < h_{t_B'} \leq (2*d^v)$ and cached item B is moved into Partition 310-1, which has a heat score range of $(1*d^v, 2*d^v]$. In an alternative embodiment, when, for example, $h_{t_B'} > 2*d^v$, cached item B would be moved into Partition 310-2.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for managing cache eviction, comprising:

establishing a plurality of time cycles for a cache, each time cycle including at least one tick, wherein an occurrence of a tick is variably determined;

assigning a heat score to each cached data item of a plurality of cached data items;

maintaining each cached data item in a partition of a plurality of contiguous partitions based on a heat score range of each partition that the heat score of each cached data item is within;

when a cached data item is accessed, updating a first heat score of the cached data item to a second heat score; and when inserting at least one data item into the cache exceeds storage space of the cache, evicting at least one cached data item from an eviction-ready partition.

2. The method of claim 1, wherein the heat score reflects a frequency and recency with which a cached data item is accessed.

3. The method of claim 1, wherein the heat score ranges of the plurality of contiguous partitions and the heat scores of each cached data item implicitly decay, by a decay factor, with each tick of a time cycle.

4. The method of claim 1, wherein the eviction-ready partition has a heat score range that includes cached data items with the lowest heat scores relative to the heat scores of other cached items.

5. The method of claim 1, wherein the occurrence of the tick is variably determined based on the occurrence of at least one cache event.

6. The method of claim 5, wherein the at least one cache event includes any one or more of: an insertion, an eviction, an access, a modification, an expiration, and a cache miss.

7. The method of claim 1, wherein each heat score range of the plurality of contiguous partitions is defined by a lower boundary and an upper boundary, wherein the lower boundary is the lowest heat score of a cached data item allowed in the partition, and wherein the upper boundary is the highest heat score of a cached item allowed in the partition, thereby partitioning the cached items based on dynamically-computed heat scores indicating a heat level of the cached items.

8. The method of claim 1, further comprising:

when a data item is inserted into the cache:

assigning the first heat score of the cached data item; and determining a current partition into which the cached data item belongs, wherein the heat score of the cached data item is within the heat score range of the current partition.

9. The method of claim 1, further comprising:

when the cached data item is accessed, computing the second heat score of the cached data item;

when the second heat score of the cached data item is outside of the heat score range of a current partition:

determining a new partition into which the cached data item belongs;

removing the cached data item from the current partition; and inserting the cached data item into the new partition.

10. The method of claim 7, further comprising:

setting the upper boundary and the lower boundary of each partition; and setting a decay factor of the time cycles.

11. The method of claim 10, when a time cycle ends, further comprising:

merging the cached data items of a $P_1$ partition into a $P_0$ partition, wherein the $P_1$ partition has a heat score range that includes cached data items with a next lowest heat scores relative to the heat scores of cached items in the $P_0$ partition;

re-labelling a partition labeled as $P_j$ to be labeled as $P_{j-1}$, wherein $2 \leq j \leq (k+1)$; and creating a new partition with a highest heat score range, wherein the new partition is empty.

12. The method of claim 1, wherein metadata of each cached data item includes the first heat score of the cached data item and a first tick in which the first heat score was computed.

13. The method of claim 12, wherein updating the first heat score of a cached data item to the second heat score further comprises:

receiving the metadata of the cached data item;

computing the second heat score based on a decay factor associated with a difference between a second tick and the first tick, the first heat score, and a cache access increment value associated with the access of the cached data item; and storing updated metadata that includes the second heat score and the second tick.

14. The method of claim 1, further comprising:

inserting at least one new data item into the cache; and assigning an initial heat score to the at least one new data item, wherein the initial heat score is higher than the heat scores of some other cached data items that were in the cache before the at least one new data item was inserted.

15. The method of claim 14, further comprising:

providing an eviction-resistance measure for cached data items with heat scores that are higher than the initial heat score of the at least one new data item, wherein an eviction-resistance measure protects the cached data items from being evicted from the cache.

16. A non-transitory computer-readable medium having stored thereon instructions for managing cache eviction, comprising:

one or more instructions that, when executed by one or more processing circuitries of a device, cause the device to:

establish a plurality of time cycles for a cache, each time cycle including at least one tick, wherein an occurrence of a tick is variably determined;

assign a heat score to each cached data item of a plurality of cached data items;

maintain each cached data item in a partition of a plurality of contiguous partitions based on a heat score range of each partition that the heat score of each cached data item is within;

when a cached data item is accessed, update a first heat score of the cached data item to a second heat score; and when inserting at least one data item into the cache exceeds storage space of the cache, evict at least one cached data item from an eviction-ready partition.

17. A system for managing cache eviction, comprising:

a processing circuitry;

a memory, the memory containing instructions that, when executed by the processing circuitry, configure the system to:

establish a plurality of time cycles for a cache, each time cycle including at least one tick, wherein an occurrence of a tick is variably determined;

assign a heat score to each cached data item of a plurality of cached data items;

maintain each cached data item in a partition of a plurality of contiguous partitions based on a heat score range of each partition that the heat score of each cached data item is within;

when a cached data item is accessed, update a first heat score of the cached data item to a second heat score; and when inserting at least one data item into the cache exceeds storage space of the cache, evict at least one cached data item from an eviction-ready partition.

18. The system of claim 17, wherein the heat score reflects a frequency and recency with which a cached data item is accessed.

19. The system of claim 17, wherein the heat score ranges of the plurality of contiguous partitions and the heat scores of each cached data item implicitly decay, by a decay factor, with each tick of a time cycle.

20. The system of claim 17, wherein the eviction-ready partition has a heat score range that includes cached data items with the lowest heat scores relative to the heat scores of other cached items.

* * * * *